April 18, 1944.  E. P. BULLARD, 3D., ET AL  2,346,660
FEED CONTROL FOR MACHINE TOOLS
Filed Oct. 31, 1939  5 Sheets-Sheet 1

Fig.1

INVENTORS
EDWARD P. BULLARD, III
LEROY E. ALVEY
PAUL H. LANGE
BY
Paul M. Grist
ATTORNEY.

Fig. 3

April 18, 1944.   E. P. BULLARD, 3D., ET AL   2,346,660
FEED CONTROL FOR MACHINE TOOLS
Filed Oct. 31, 1939   5 Sheets-Sheet 5

INVENTORS
EDWARD P. BULLARD, III
LEROY E. ALVEY
PAUL H. LANGE
BY
Paul M. Gist
ATTORNEY Patented Apr. 18, 1944

2,346,660

UNITED STATES PATENT OFFICE 2,346,660

FEED CONTROL FOR MACHINE TOOLS

Edward P. Bullard, III, Fairfield, and Leroy E. Alvey and Paul H. Lange, Bridgeport, Conn., assignors to The Bullard Company, a corporation of Connecticut Application October 31, 1939, Serial No. 302,196

24 Claims. (Cl. 74—346)

This invention relates to transmissions for moving a member along one or more paths, and particularly to apparatus for disengaging the member from the transmission at pre-selected points along its paths of movement.

The broad principles of the invention may be applied to any apparatus in which an element is adapted to be moved from one position, where certain forces act to perform a function, to an inactive position, or through an inactive position to another position, where certain other forces act to perform another function.

Objects of the invention include, the provision of apparatus capable of amplifying a relatively slight rectilinear movement and transmitting the amplified movement to a remote point within substantially a minimum time interval; the provision of apparatus in which a member is adapted to be shifted from one axial position to another axial position by an oscillatable element and to be centralized between said axial positions by a reciprocable member cooperating with an oscillatable element; the provision of apparatus including a movable member in which the travel of the member is substantially instantaneously stopped at preselected points by the action of a reciprocable member cooperating with an oscillatable member; the provision of apparatus in which a member is adapted to be moved along intersecting paths by separate driven shafts, and stopped at preselected points in either of its paths by the cooperation of a single reciprocable member that cooperates with oscillatable means associated with each of the driven shafts; the provision of apparatus including an indexable turret head adapted to be moved along a rectilinear path and provided with a device for selectively engaging adjustable abutments for each station of said head for imparting slight rectilinear movement to a member on which said abutments are mounted when the head is moved along its rectilinear path; the provision of such apparatus including a turret head having safety features to prevent breaking or overloading the device that selectively engages the adjustable abutments; and the provision of apparatus including a transmission in which a movable member is provided with a selectively operable arm adapted to engage an abutment adjustably mounted on a reciprocable member, the movement of which operates the starting switch of a fluid-operated thrustor to disengage the member from the transmission of the apparatus.

Other objects and novel features of the invention will become apparent from a consideration of the following specification and accompanying drawings in which.

Figure 1:
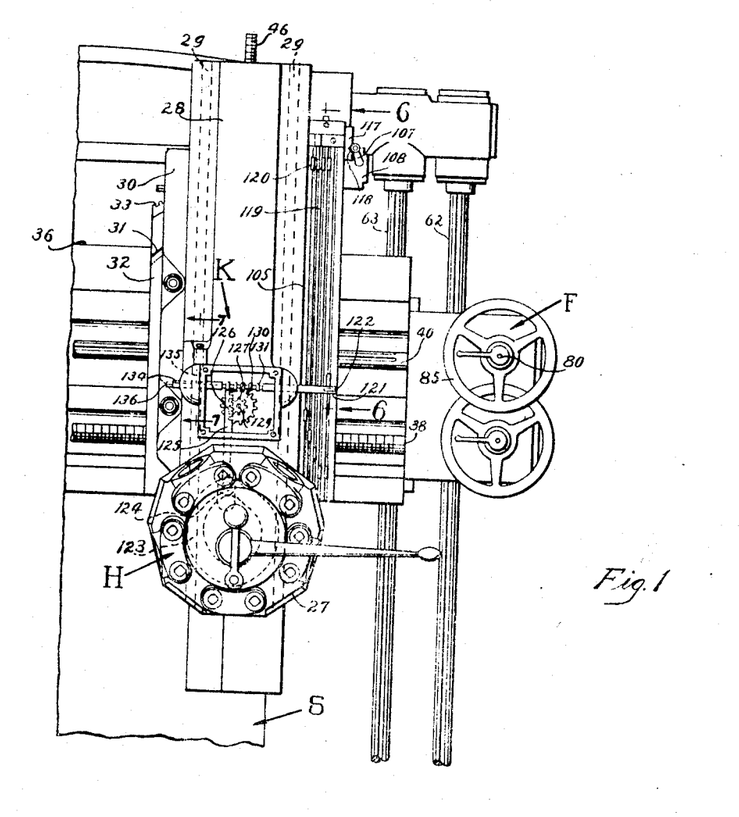
Fig. 1 is a front elevational view of a portion of a vertical turret lathe to which the principles of this invention have been applied.
Figure 2:
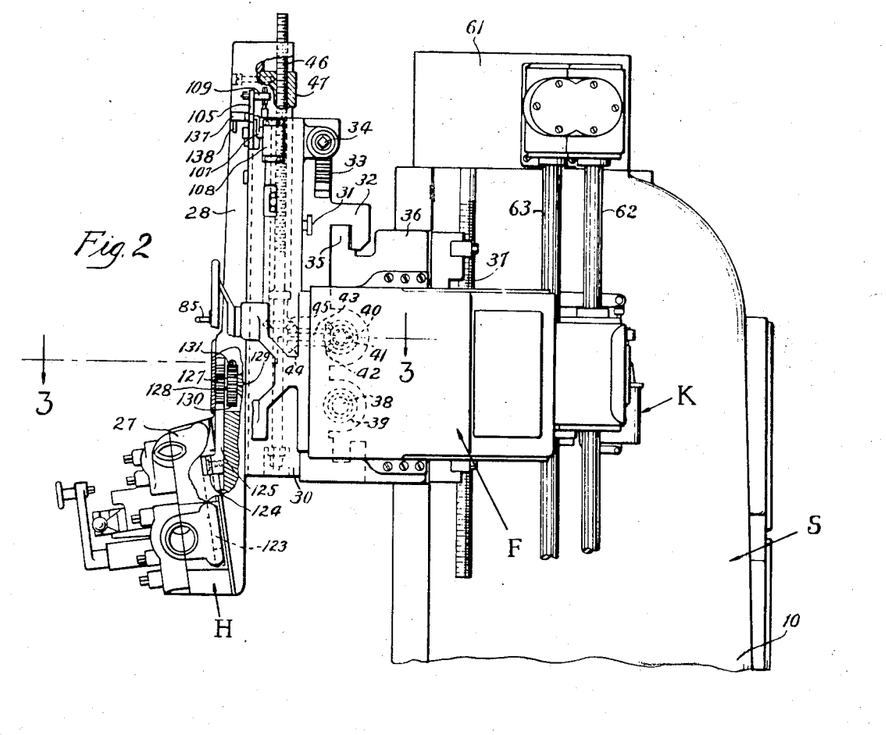
Fig. 2 is a right-hand side elevational view of the apparatus shown in Fig. 1, certain parts being removed, and certain other parts broken away to show constructional features of the apparatus.
Figure 5:
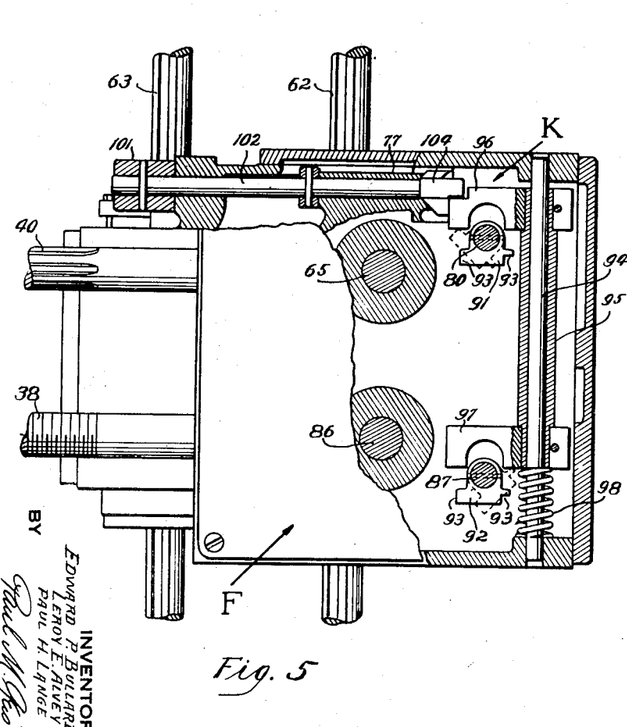
Fig. 5 is a front elevational view of the apparatus shown in Fig. 4, with parts broken away to disclose sectional views of certain features of the invention as viewed substantially along line 5—5 of Fig. 4.

Referring to the drawings, a turret head H is mounted on the front of a standard S and is adapted to be moved along intersecting paths under the influence of a feed-works transmission F. The feed-works F is driven by means (not shown), which delivers a plurality of relatively slow speeds of rotation, and a substantially constant, relatively fast speed of rotation to each of a pair of driven shafts that control the movement of the head H along its intersecting paths. During operation of the machine it is necessary to limit the travel of the head H within extremely close limits by disengaging it from the feed-works F at various preselected points along the path of travel of the head. Accordingly, a feed knock-out mechanism K is provided between the turret head H and the feed-works F (Figs. 1, 2 and 5). The operation of the feed knock-out K is initiated by a relatively slight movement of the head H after it has arrived at a preselected position along either of its paths of travel. This slight movement actuates a switch to energize the circuit of a motor for starting the pump of a fluid-operated thrustor. The thrustor instantly responds and transmits the relatively slight motion, in amplified form, to a point within the feed-works F, where it is employed to disengage clutches that control the movement of the head H.

Figure 3:
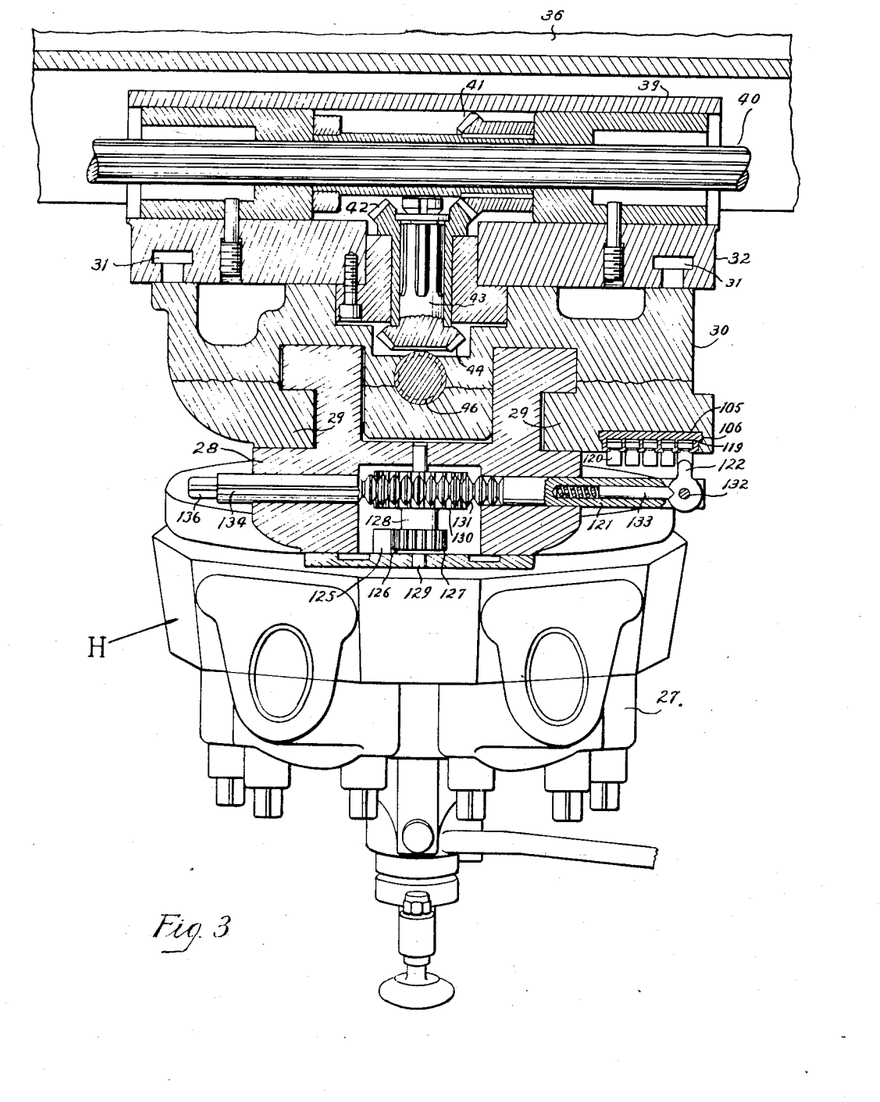
Fig. 3 is a sectional view taken substantially along line 3—3 of Fig. 2.

Referring to Fig. 3, the turret head H comprises a multi-element supporting turret 27 rotatably mounted on a pin fixed to the lower end of a turret slide 28. The slide member 28 is constructed with longitudinal bearing grooves which cooperate with mating guide bearings 29 on a swivel 30 which latter is provided with a connector adapted to ride in an arcuate groove 31 located in the front face of a saddle 32 (Fig. 2). The saddle 32 is provided with an arcuate rack 33 which cooperates with a worm gear on a shaft 34 journaled in the swivel 30. The saddle 32 is supported on a horizontally disposed slide bearing 35 of a cross-rail 36, which latter is gibbed to the front face of the standard S and is adapted to be moved vertically therealong by the rotation of vertically disposed screws 37 located on each side of the standard S.

The head H is moved horizontally along the slide bearing 35 of the cross-rail 36 by a horizontally disposed screw 38 (Figs. 1 and 2) that is threaded into a boss 39 on the rear of the saddle 32. Reciprocation of the turret H along bearings 29 of swivel 30 is effected by a splined shaft 40 (Fig. 3) parallel with screw 38 that slidingly supports a bevel gear 41 that meshes with a bevel gear 42 fixed to one end of a stub shaft 43. The stub shaft 43 is journaled in the saddle 32 and the swivel 30 at the center of the arcuate groove 31, thereby providing a pivot for the swivel 30. The end of the stub shaft 43 opposite to that which supports gear 42 fixedly supports a bevel gear 44 in mesh with a bevel gear 45 (Fig. 2) keyed to a vertically-disposed screw 46, the upper end of which is threaded into a boss 47 fixed to the top of the slide member 28, and the lower end of which is journaled in a bearing near the bottom portion of the swivel 30. From the foregoing it is apparent that rotation of the horizontal screw 38 and the splined shaft 40 will effect movement of the turret head H horizontally along the cross-rail 36, and along the bearings 29 of swivel 30 respectively.

Rotative power for screw 38 and shaft 40 is provided by the feed-works F rigidly mounted on one end of the cross-rail 36.

The feed-works F forms no part of the present invention, and it will be described only generally to illustrate the principles of the present invention. The feed-works F is fully described and claimed in co-pending application, Serial No. 299,134, filed Oct. 12, 1939, in the name of Edward P. Bullard, III.

Power is adapted to be supplied to the feed-works transmission F by rotating shafts 62 and 63 by any suitable means not shown. The shaft 62 is adapted to be rotated at a relatively rapid constant speed and the shaft 63 is adapted to be rotated at a relatively slow speed.

Figure 4:
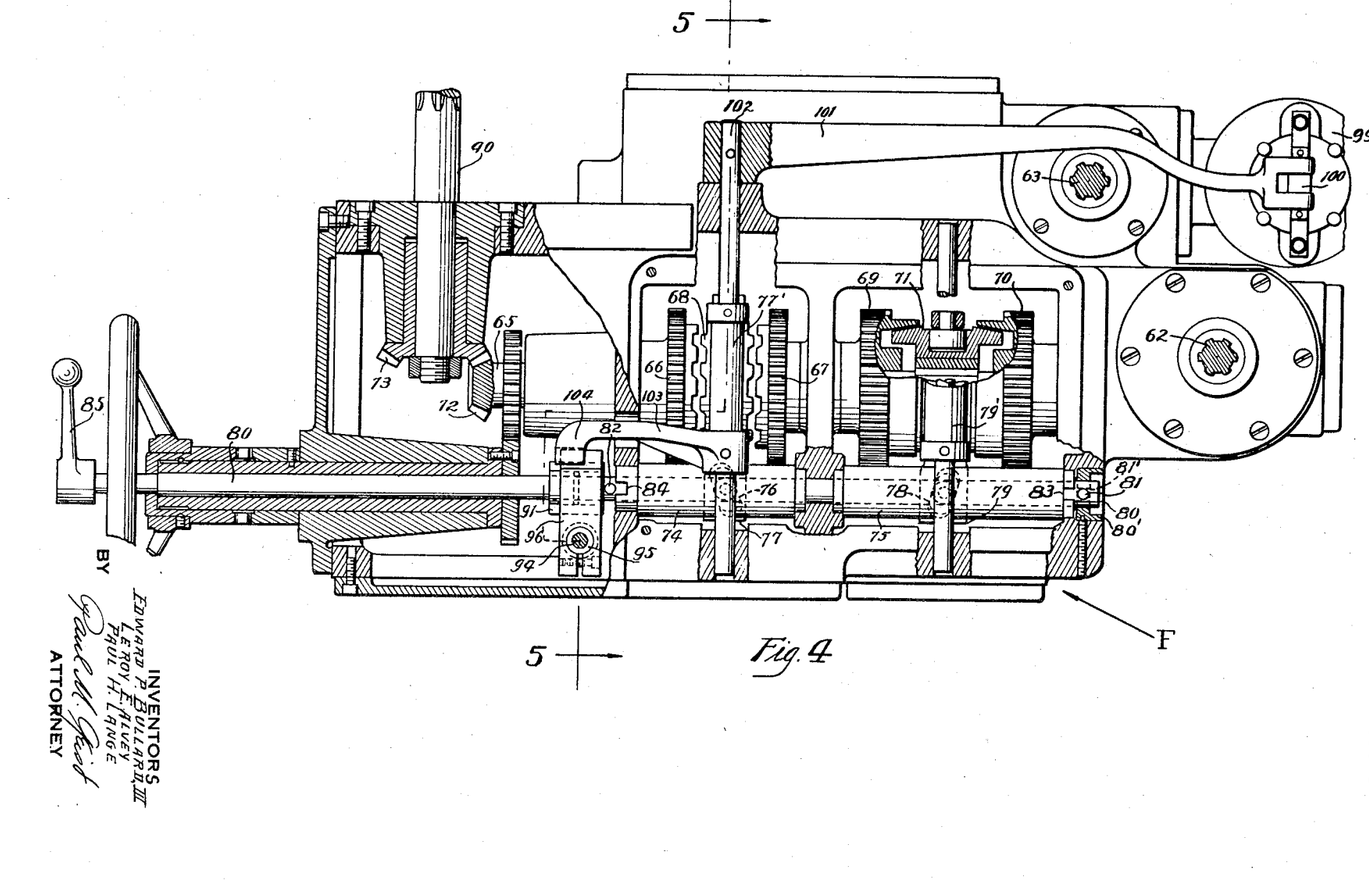
Fig. 4 is a top plan view of the transmission housing with a portion of the cover removed.

Referring to Fig. 4, the feed-works includes a driving shaft 65 on which a pair of gears 66 and 67 are journaled. A positive-action clutch 68 is splined to shaft 65 and is provided with clutch teeth on each of its faces adapted to mesh with corresponding clutch teeth on the sides of gears 66 and 67 that face each other. The gears 66 and 67 are adapted to be rotated in opposite directions through a variable-speed transmission unit as described in co-pending application, Serial No. 299,134. The rotation of splined shaft 63 is transmitted through said variable speed unit to the gears 66 and 67 so that they may be rotated in opposite directions at a plurality of relatively slow speeds. Additionally, the shaft 65 is adapted to support a pair of gears 69 and 70 between which a friction cone clutch 71 is splined to the shaft 65. The clutch 71 is adapted to cooperate with corresponding clutch surfaces on the faces of gears 69 and 70 that face each other. Power from splined shaft 62 is transmitted through suitable gearing to the gears 69 and 70 so that these gears rotate in opposite direction at substantially a constant, relatively rapid speed. Selective shifting of the clutches 68 and 71 will cause shaft 65 to be driven in opposite directions at a plurality of separate relatively slow speeds, and at a substantially constant, relatively rapid speed. The rotation of shaft 65 is transmitted to the splined shaft 40 through a pair of bevel gears 72, 73.

Each of the clutches 68 and 71 is adapted to be moved from one axial position, where the shaft 65 is rotated either at a plurality of relatively slow speeds or at a substantially constant, relatively rapid speed in a forward direction, through an inactive or neutral position, to another axial position where the shaft 65 is rotated in a reverse direction under the same circumstances as it was rotated in the forward direction. The axial shifting of the clutches 68 and 71 is effected by the oscillation of a pair of axially-aligned oscillatable sleeves 74 and 75. The sleeve 74 is provided with a circumferential groove 76 that cooperates with a roller mounted on an arm 77 connected to a yoke element 77' in engagement with the clutch 68. Likewise, the sleeve 75 is provided with a circumferential groove 78 that cooperates with a roller mounted on an arm 79 connected to a yoke 79' in engagement with the clutch 71. Selective oscillatable movement of the sleeves 74 and 75 is provided by a relatively long shaft 80 extending therethrough. The shaft 80 is provided with pins 81 and 82 that are adapted to be moved into and out of engagement with slots 83 and 84 in the non-adjacent ends of the sleeves 74 and 75. The shaft 80 extends to the outside of the feed-works F and is provided with a handle 85. Axial shifting of the shaft 80 to the left as viewed in Fig. 4 causes pin 81 to engage slot 83, whereupon oscillating shaft 80 effects shifting of the clutch 71 into and out of engagement with either gear 69 or 70 to thereby drive shaft 65 at a substantially constant relatively rapid speed in either direction. Axial shifting of the shaft 80 to the right as viewed in Fig. 4, will cause pin 82 to engage slot 84, whereupon oscillating shaft 80 will effect shifting of clutch 68 into and out of engagement with either gear 66 or 67 to drive shaft 65 at a plurality of relatively slow speeds in either direction. The shaft 80 is adapted to extend through an opening in a cup-shaped member 80'. The opening includes a slot 81' through which the pin 81 is adapted to pass only when the shaft 80 is in position insuring the neutrality of clutches 68 and 71. This construction, therefore, prevents the shifting of the clutches 68 and 71 into effective position at the same time.

Referring to Fig. 5, a shaft 86 identical with, and located directly beneath shaft 65 is adapted to support four gears for driving screw 38 in both directions at a plurality of relatively slow speeds, and at a substantially constant relatively rapid speed in the same manner that shaft 65 drives splined shaft 40. Likewise a shaft 87 identical with shaft 80 is provided for selectively oscillating an additional pair of axially-aligned sleeves for controlling the shifting of clutches on the shaft 86 in the same manner that shaft 80 is adapted to selectively oscillate the axially-aligned sleeves 74 and 75 that shift the clutches 68 and 71 on shaft 65. The specific construction of the feed-works for effecting these functions is more fully described in the above-referred-to co-pending application, Serial No. 299,134.

From an inspection of Figs. 4 and 5, it is apparent that the clutches 68 and 71 on shaft 65 and the corresponding clutches on shaft 86 are adapted to be moved from one axial position through neutral to another axial position in order to engage the various gear combinations within the feed-works F with the screw 38 and shaft 40. Furthermore the axial shifting of these clutches is effected by the oscillation of shafts 80 and 87 an equal amount on either side of central neutral positions.

The feed knock-out K is adapted to return the oscillatable shafts 80 and 87 to their central positions, thereby neutralizing the clutches 68 and 71 on shaft 65 and the corresponding clutches on shaft 86. This function is adapted to occur when the head H arrives at a predetermined point in either of its intersecting paths.

Referring to Fig. 5, the feed knock-out mechanism K includes collars 91 and 92 clamped to shafts 80 and 87 respectively. The collar 91 is provided with two ears 93 that are disposed on opposite sides of, and have surfaces that lie in, a plane that intersects shaft 80. Collar 92 is identical with collar 91 and it is clamped on shaft 87 in the same manner as collar 91 is clamped on shaft 80. The ears 93 on both collars 91 and 92 are adapted to lie in substantially horizontal planes when the shafts 80 and 87 and their corresponding clutch elements are in neutral. Oscillating shafts 80 and 87 to shift their corresponding clutches into driving position, causes the planes that contain ears 93 to become angularly disposed with respect to the horizontal as illustrated by the dotted lines in Fig. 5. A vertically-disposed shaft 94 adjacent the shafts 80 and 87 is provided with a relatively long vertically-reciprocable sleeve 95. The sleeve 95 rigidly supports yoke elements 96 and 97 that overlie the ears 93 of collars 91 and 92 on shafts 80 and 87. Normally, the sleeve 95 is urged upwardly out of active position by a spring 98. Movement of the sleeve 95 downwardly causes the legs of yokes 96 and 97 to engage the ears 93 forcing the collars 91 and 92 into a position where the ears lie in substantially horizontal planes, thereby insuring that the clutches controlled by the shafts 80 and 87 are in their neutral positions.

Referring to Figs. 4 and 5, vertically-downward movement of the sleeve 95 is effected by the actuation of a fluid-operated electrically-controlled thrustor 99. The thrustor 99 is located on the back of the feed-works F and is of conventional design, comprising a cylinder in which a vertically-reciprocable plunger is adapted to operate. The plunger is provided with a rod 100 pivotally connected to a link 101 that extends forwardly to near the front of the feed-works. Referring to Fig. 4, the link 101 is rigidly connected to a shaft 102 that extends transversely through the feed-works and on which the yoke element 77' is journaled. A pusher link 103 is rigidly connected to the shaft 102 and includes an abutment portion 104 that overlies a portion of one of the yokes 96 or 97. Accordingly, energization of the circuit of a motor that operates the thrustor 99 causes an upward movement of the rod 100 and link 101, thereby turning shaft 102 so that link 103 is forced downwardly into engagement with one of the yokes 96 or 97 and causing their downward movement which will oscillate either of shafts 80 and 87 into their neutral positions if they are not already in such position. Accordingly such action will disengage the feed-works F from the shafts 38 and 40 thereby stopping the head H at preselected points along its respective paths.

Figure 6:
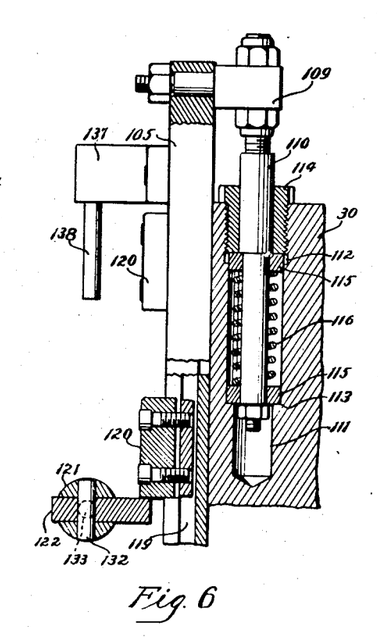
Fig. 6 is an enlarged sectional elevational view taken substantially along line 6—6 of Fig. 1.

Referring to Figs. 1, 2, and 3, energization of the circuit of the motor for the thrustor 99 is effected by a relatively slight rectilinear movement of a plate 105 mounted for reciprocation in slide bearings 106 (Fig. 3) on the swivel 30. This relatively slight rectilinear movement of the plate 105 is adapted to actuate an arm 107 (Fig. 1) of an electric contact 108 likewise mounted on the swivel 30. Referring to Fig. 6, the mounting of plate 105 on the swivel 30 includes an eye bolt 109 fixed to the top of plate 105 for rigidly supporting a shaft 110 extending downwardly into a bored opening 111 in the swivel 30. The bore 111 is counterbored at 112, 113 and a gland 114, fixed in counterbored portion 112, forms a slide bearing for the shaft 110. A pair of collars 115 surround a portion of the shaft 110 and are mounted for free rotation and sliding movement thereon. The lower collar 115 abuts against the bottom of the counterbored portion 113 while the upper collar 115 bears against the lower end of the gland 114. A compression spring 116 surrounds the lower end of the shaft 110 and is located between the collars 115. The construction is such that the reciprocable plate 105 is resiliently urged towards a central position upon the release of a force that has moved it to either side of said central position.

Referring to Fig. 1, plate 105 is provided with a cam 117 having high portions on each side of a low portion 118. The spring 116 (Fig. 6) normally locates the plate 105 in a position where a roller on arm 107 of switch 108 is resiliently urged into the low portion 118 of cam 117 normally holding the switch 108 open. Upon relatively slight rectilinear movement of plate 105 in either direction the arm 107 of switch 108 will be turned in a clockwise direction thereby closing the switch 108, energizing the circuit of the motor for the thrustor 109, and causing the feed-works F to become disengaged from the screw 38 and shaft 40.

In the present embodiment of the invention the turret head H consists of five stations. It is desirable to provide a control between each of the specific stations of the turret head H and the electric switch 108 so that automatic operation of the machine may be effected. Referring to Figs. 1 and 3, the plate 105 is provided with five parallel grooves 119 adapted to receive abutment members 120 at both ends thereof. The abutment members 120 are adapted to be adjustably located along their grooves to control the stroke of the turret head H. A reciprocable arm 121 provided with a finger portion 122 is adapted to be selectively moved across the grooves 119 into position aligned with the abutments 120. Control of the reciprocation of the arm 121 is effected by the indexing of the turret head H. A cam groove 123 (Fig. 1) is provided on the back face of the turret head H adapted to receive a roller 124 mounted on the lower end of a reciprocable rod 125. The rod 125 is provided with a rack 126 at its upper end adapted to mesh with a gear 127 (Fig. 3) of a gear unit 128. The gear unit 128 is journaled on a stub shaft 129 and includes an additional gear 130 adapted to mesh with rack teeth 131 formed on the arm 121. The construction of the cam groove 123 is designed to cause reciprocation of the rod 125 to successively move the finger 122 of the rod 121 into aligned relation with the abutments 120 within the various grooves 119. In this manner, as the head H is indexed, the finger 122 automatically moves into alignment with the abutment 120 within the groove 119 corresponding to the station of the turret head that is in working position.

Several safety features are provided to prevent breakage of the parts in the event the operator inadvertently leaves an abutment 120 in position such that the finger 122 will engage its side as it moves across the plate 105, and in event that the finger 122 encounters an excessive load when it engages an abutment 120 as it moves in either direction with the head H. Referring to Fig. 3, finger 122 is pivotally mounted on a pin 132 extending across a bifurcated end portion of the rod 121. A spring-pressed detent 133 is adapted to cooperate with a notch in the side of the finger 122 to retain it against oscillatable movement about the pin 132. The finger 122 is, therefore, mounted so that relative movement between it and the arm 121 may be accomplished in one direction but not in the other. Accordingly, should the finger 122 engage the side of an abutment 120 while moving across the plate 105, it will merely pivot around the pin 132 and prevent breakage thereof. Manual re-setting of the finger 122 is necessary before it can be employed to reciprocate the plate 105.

Figure 7:
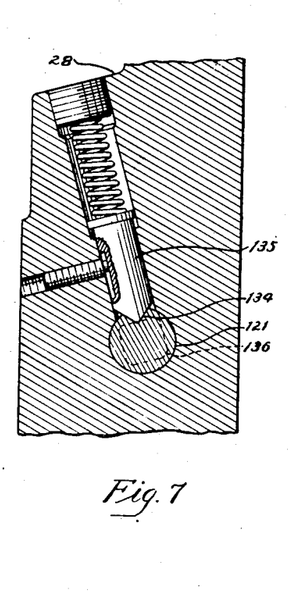
Fig. 7 is an enlarged sectional view taken substantially along line 7—7 of Fig. 1.

The rack teeth 131 on the arm 121 extend peripherally about the arm 121 and form another safety feature. A longitudinally-extending groove 134 is provided in the rod 121 into which a spring-pressed detent 135 (Fig. 7) is adapted to seat and to releasably retain the arm 121 against rotation. However, should the reciprocation of plate 105 require an excessive force, such that the finger 122 might be broken, the arm 121 will merely rotate about its longitudinal axis. Manual re-setting of the arm 121 can be effected by applying a wrench to the squared end 136 (Fig. 1) of the arm 121.

Referring to Fig. 6, an angle member 137 is mounted at the top of the plate 105, to which a rod 138 is fixed in aligned relation with the arm 121. The construction and arrangement is such that if the finger 122 fails to engage an abutment 120, the upward travel of the turret or main head H would be limited by the engagement of arm 121 with rod 138 causing the plate 105 to be raised thereby closing the contact 108 to energize the motor circuit for the thrustor 99.

Although the various features of the improved feed knock-out mechanism have been shown and described in detail to fully disclose one embodiment of the invention, it will be evident that numerous changes may be made in such details, and certain features may be used without others, without departing from the principles of the invention. Furthermore, although the principles of the invention have been shown and described in connection with the movement of the main or turret head along the bearings 29 in the swivel 30, they can be applied with equal facility to the movement of said main head along the cross-rail 36 by mounting a plate on the cross-rail similar to plate 105 and employing a switch similar to switch 108 that could be wired in parallel with the circuit of switch 108.

What is claimed is:

1. Apparatus comprising a clutch adapted to be shifted from one axial position to another axial position; a yoke connected to said clutch having an arm supporting a roller; an oscillatable sleeve having a peripheral cam groove adapted to receive said roller; abutments located on opposite sides of means adapted to cooperate with said sleeve; a reciprocable member having means adapted to cooperate with said abutments to move said sleeve to position said clutch substantially midway between said axial positions; and a fluid operated thrustor adapted to move said reciprocable member.

2. Apparatus comprising a plurality of members adapted selectively to be shifted between two axial positions; separate oscillatable means for shifting said members between said axial positions; common oscillatable means adapted to be selectively engaged to and disengaged from said separate oscillatable means; means for preventing disengagement of said common means from either of said separate oscillatable means until the latter is in position to locate its corresponding member substantially midway between its axial positions; and a reciprocable member adapted to co-operate with means on said common means for positioning the member in engagement with said common means substantially midway between its axial positions.

3. Apparatus as claimed in claim 2, in which said separate oscillatable means comprises a pair of axially-aligned sleeves having peripheral cam grooves; and said members are provided with arms supporting rollers adapted to co-operate with said cam grooves.

4. Apparatus as claimed in claim 2, in which said separate oscillatable means comprises a pair of axially-aligned sleeves having peripheral cam grooves; said members are provided with arms supporting rollers that co-operate with said cam grooves; and said common oscillatable means comprises an axially-shiftable shaft extending through said axially-aligned sleeves and provided with means for engaging one of said sleeves in each of its axially-shiftable positions.

5. Apparatus as claimed in claim 2, in which said separate oscillatable means comprises a pair of axially-aligned sleeves having peripheral cam grooves; said members are provided with arms supporting rollers that co-operate with said cam grooves; said common oscillatable means comprises an axially-shiftable shaft extending through said axially-aligned sleeves and includes means for engaging one of said sleeves in each of its axially-shiftable positions; and said means for preventing disengagement of said axially-shiftable shaft from either of said sleeves comprises a cup-shaped member through which one end of said shaft passes, said cup-shaped member additionally includes a slot through which the means for engaging one of said sleeves is adapted to pass, said slot being arranged so that the sleeves must be in position where their corresponding axially-shiftable members are substantially midway between their axial positions before said shaft can be axially shifted to disengage one sleeve and engage the other.

6. Apparatus comprising two pairs of members each member being adapted to be shifted between two axial positions; each pair of said members being arranged on parallel spaced shafts; separate oscillatable means for shifting each of said members between their axial positions; the oscillatable means for each pair of said members being arranged along parallel spaced axes; means common to each pair of said oscillatable means adapted to be selectively engaged to and disengaged from the respective oscillatable means; and a reciprocable member adapted to co-operate with means on both of said common means for positioning the members substantially midway of their axial positions.

7. Apparatus as claimed in claim 6, in which means is provided for preventing the disengagement of either of said common means from either of the oscillatable means of the pair said common means controls until the oscillatable means with which said common means is engaged is in position to locate its corresponding member substantially midway between its axial positions.

8. A transmission for moving an element comprising in combination, a driving shaft, a driven shaft; gearing for transmitting power from said driving shaft to said driven shaft, including means for rotating said driven shaft in opposite directions; a clutch for selectively engaging said driven shaft with said oppositely rotatable means; oscillatable means for shifting said clutch from one axial position through a neutral position to another axial position; neutralizing means independently movable relatively to said oscillatable means, adapted to co-operate with said oscillatable means for shifting said clutch to its neutral position; and power-operated means responsive to the movement of said element for actuating said neutralizing means substantially instantaneously.

9. A transmission as claimed in claim 8, in which said clutch-neutralizing means comprises a reciprocable member.

10. A transmission as claimed in claim 8, in which said oscillatable means is adapted to be moved in opposite directions from a neutral position; and said clutch-neutralizing means comprises a reciprocable member adapted to return said oscillatable means to its neutral position.

11. A transmission comprising in combination, a driving shaft; a driven shaft; gearing for transmitting power from said driving shaft to said driven shaft including means for rotating said driven shaft in opposite directions at a plurality of relatively slow separate speeds, and at a substantially-constant relative fast speed; a pair of clutches for selectively engaging said driven shaft with any one of said oppositely-rotatable means; separate oscillatable means for shifting said clutches from one axial position through a neutral position to another axial position; common oscillatable means adapted to be selectively engaged to, and disengaged from said separate oscillatable means; means for preventing disengagement of said common means from either of said separate oscillatable means until the latter is in position to locate its corresponding clutch in neutral; and a reciprocable member adapted to co-operate with means on said common means for shifting the clutch in engagement with said common means into neutral.

12. A transmission as claimed in claim 11, in which said separate oscillatable means comprises a pair of axially-aligned sleeves having peripheral cam grooves; and said clutches are provided with arms supporting rollers adapted to co-operate with said cam grooves.

13. A transmission as claimed in claim 11, in which said separate oscillatable means comprises a pair of axially-aligned sleeves having peripheral cam grooves; said clutches are provided with arms supporting rollers that co-operate with said cam grooves; and said common oscillatable means comprises an axially-shiftable shaft extending through said axially-aligned sleeves and provided with means for engaging one of said sleeves in each of its axially-shiftable positions.

14. A transmission as claimed in claim 11, in which a fluid-operated thrustor is provided for actuating said reciprocable member.

15. In a transmission for moving an element, a plurality of members mounted on a single shaft and adapted to be shifted between two axial positions; separate oscillatable means for shifting each of said members between their axial positions, said separate means being arranged in aligned relation; a reciprocable member independently movable relatively to said oscillatable means, adapted to cooperate with said oscillatable means to position said members substantially midway between their axial positions; and means responsive to the movement of said element for actuating said reciprocable member substantially instantaneously.

16. In a transmission for operating an apparatus, a plurality of members mounted on parallel spaced shafts and adapted to be shifted between two axial positions; separate oscillatable means for shifting each of said members between their axial positions, said separate oscillatable means being arranged along parallel spaced axes; a reciprocable member independently movable relatively to said oscillatable means, adapted to cooperate with said oscillatable means to position said members substantially midway between their axial positions, and means responsive to the operation of said apparatus for actuating said reciprocable member substantially instantaneously.

17. A transmission for operating an apparatus comprising in combination, a driving shaft; a driven shaft; gearing for transmitting power from said driving shaft to said driven shaft, including means for rotating said driven shaft in opposite directions; a clutch for selectively engaging said driven shaft with said oppositely rotatable means; oscillatable means for shifting said clutch from one axial position through a neutral position to another axial position including a sleeve having a peripheral cam groove; a yoke connected to said clutch and provided with a roller adapted to engage said cam groove; neutralizing means independently movable relatively to said oscillatable means, adapted to co-operate with said oscillatable means for shifting said clutch to its neutral position; and power-operated means responsive to the operation of said apparatus for actuating said neutralizing means substantially instantaneously.

18. A transmission for moving an element comprising in combination, a driving shaft; a driven shaft; gearing for transmitting power from said driving shaft to said driven shaft, including means for rotating said driven shaft in opposite directions; a clutch for selectively engaging said driven shaft with said oppositely rotatable means; oscillatable means for shifting said clutch from one axial position through a neutral position to another axial position; a reciprocable member independently movable relatively to said oscillatable means, adapted to co-operate with said oscillatable means for shifting said clutch to its neutral position; and a fluid operated thrustor responsive to the movement of said element for actuating said reciprocable member.

19. In a transmission for moving an element, a member adapted to be shifted from one axial position to another axial position; an oscillatable sleeve for shifting said member between said axial positions; a pair of abutments located on opposite sides of means adapted to cooperate with said sleeve; a reciprocable member having means adapted to cooperate with said abutments for positioning said sleeve so that said member is moved to a point substantially midway between said axial positions; and power-operated means responsive to the movement of said element for actuating said reciprocable member substantially instantaneously.

20. In a transmission for moving an element, a member adapted to be shifted from one axial position to another axial position; an oscillatable sleeve having a peripheral cam groove for shifting said member between said axial positions; an arm associated with said member; a roller supported on said arm and adapted to fit within said cam groove; a reciprocable member adapted to cooperate with said oscillatable means to position said member substantially midway between said axial positions; and power-operated means responsive to the movement of said element for actuating said reciprocable member substantially instantaneously.

21. In a transmission for moving an element, a member adapted to be shifted from one axial position to another axial position; oscillatable means for shifting said member between said axial positions; a reciprocable member adapted to cooperate with said oscillatable means to position said member substantially midway between said axial positions; and means independent of the movement of both said oscillatable means and said reciprocable member but responsive to the movement of said element for actuating said reciprocable member.

22. Apparatus for moving an element comprising a member adapted to be shifted from one axial position to another axial position; oscillatable means for shifting said member between said axial positions; reciprocable means for shifting said member to a position substantially midway between said axial positions, said reciprocable means being adapted to cooperate with abutments located on opposite sides of means that cooperate with said oscillatable means and a fluid-operated thrustor responsive to the movement of said element for actuating said reciprocable means.

23. In a transmission for moving an element, a member adapted to be shifted from one axial position to another axial position; oscillatable means for shifting said member between said axial positions; reciprocable means independently movable relatively to said oscillatable means, adapted to cooperate with said oscillatable means to position said member substantially midway between said axial positions; and means responsive to the movement of said element for actuating said reciprocable means substantially instantaneously.

24. In a transmission for moving an element, a plurality of members each adapted to be shifted between two axial positions; separate oscillatable means for shifting each of said members between their axial positions; reciprocable means independently movable relatively to said oscillatable means, adapted to cooperate with said oscillatable means to position said members substantially midway between their axial positions; and power-operated means responsive to the movement of said element for actuating said reciprocable member substantialy instantaneously.

EDWARD P. BULLARD, III.
LEROY E. ALVEY.
PAUL H. LANGE.